United States Patent
Park et al.

(10) Patent No.: US 9,240,050 B2
(45) Date of Patent: Jan. 19, 2016

(54) METHOD AND APPARATUS FOR PROCESSING IMAGE DATA CORRESPONDING TO TEMPORALLY SUCCESSIVE MOTIONS OF OBJECT

(71) Applicant: SAMSUNG ELECTRONICS CO., LTD., Suwon-si (KR)

(72) Inventors: Seung-Ho Park, Seoul (KR); Jae-Hyun Kim, Seoul (KR); Se-Hyeok Park, Seoul (KR); Tae-Gyoung Ahn, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 170 days.

(21) Appl. No.: 13/870,484

(22) Filed: Apr. 25, 2013

(65) Prior Publication Data

US 2014/0147012 A1 May 29, 2014

(30) Foreign Application Priority Data

Nov. 23, 2012 (KR) .................. 10-2012-0133632

(51) Int. Cl.
*G06T 7/20* (2006.01)
*H04N 19/513* (2014.01)
*H04N 19/553* (2014.01)

(52) U.S. Cl.
CPC ............ *G06T 7/2013* (2013.01); *H04N 19/513* (2014.11); *G06T 2207/10016* (2013.01); *G06T 2207/20021* (2013.01); *G06T 2207/30196* (2013.01); *H04N 19/521* (2014.11); *H04N 19/553* (2014.11)

(58) Field of Classification Search
CPC ........ G06T 9/00; G06T 9/004; H04N 19/139; H04N 19/51; H04N 19/552; H04N 19/521; H04N 19/553
USPC .................................. 382/275, 232, 236, 238
See application file for complete search history.

(56) References Cited

U.S. PATENT DOCUMENTS

| | | | | |
|---|---|---|---|---|
| 5,612,745 | A * | 3/1997 | Ozcelik et al. ............ | 375/240.12 |
| 6,487,313 | B1* | 11/2002 | De Haan et al. ............... | 382/236 |
| 8,774,276 | B2* | 7/2014 | Lin et al. ................... | 375/240.16 |
| 2004/0252763 | A1* | 12/2004 | Mertens .................... | 375/240.16 |
| 2005/0129124 | A1* | 6/2005 | Ha ............................ | 375/240.16 |
| 2006/0244866 | A1* | 11/2006 | Kishida ......................... | 348/699 |
| 2007/0002058 | A1* | 1/2007 | Wittebrood .................... | 345/475 |
| 2009/0147851 | A1* | 6/2009 | Klein Gunnewiek et al. ......................... | 375/240.16 |
| 2009/0213937 | A1* | 8/2009 | Kawase et al. ............ | 375/240.16 |
| 2010/0225788 | A1* | 9/2010 | Hung et al. ...................... | 348/241 |
| 2010/0236680 | A1* | 9/2010 | Mukai ....................... | 152/209.16 |
| 2012/0033130 | A1* | 2/2012 | Piek ............................. | 348/441 |

OTHER PUBLICATIONS de Haan, et al. "True-Motion Estimation with 3-D Recursive Search Block Matching." IEEE Transactions on Circuits and Systems for Video Technology. 3.5 (1993): 368-379. Print.*

* cited by examiner

*Primary Examiner* — Michael A Newman
(74) *Attorney, Agent, or Firm* — Sughrue Mion, PLLC (57) ABSTRACT

A method for processing image data corresponding to temporally successive motions of an object, the method including adjusting a range of a first occlusion region which is estimated according to whether position changes occur in sub-blocks forming temporally successive first and second frames among image frames which display the motions of the object, by using Motion Vectors (MVs) mapped to the sub-blocks and detecting a second occlusion region of a third frame which displays the object that moves between the first frame and the second frame, by using the adjusted range of the first occlusion region.

11 Claims, 8 Drawing Sheets

METHOD AND APPARATUS FOR PROCESSING IMAGE DATA CORRESPONDING TO TEMPORALLY SUCCESSIVE MOTIONS OF OBJECT

CROSS-REFERENCE TO RELATED APPLICATION

This application claims priority from Korean Patent Application No. 10-2012-0133632 filed in the Korean Intellectual Property Office on Nov. 23, 2012, the entire disclosure of which is hereby incorporated by reference.

BACKGROUND

1. Field

Methods and apparatuses consistent with exemplary embodiments generally relate to a technique for processing images corresponding to temporally successive motions of an object, and more particularly, to a method and apparatus for detecting an occlusion region in generation of an interpolation image frame which compensates for a motion of the object between two successive image frames.

2. Description of the Related Art

Generally, in image processing on a device for displaying image frames, frame rates are converted through conversion into another format. This frame rate conversion process inserts or removes additional frames between existing frames without changing a total time length of the existing frames. If an object moves between temporally successive image frames, the object may newly appear on a background or may disappear behind the background. Consequently, a current frame which displays the motion result of the object may display regions which have not been displayed on the previous frame, that is, the newly appearing or disappearing region (hereinafter, 'an occlusion region'). Hence, research has been carried out on methods for accurately detecting an occlusion region generated due to a motion of an object between two temporally successive image frames.

SUMMARY

Accordingly, exemplary embodiments provide a method and apparatus for improving the accuracy of detection of an occlusion region in generation of an interpolation image frame which compensates for a motion of an object between two successive image frames.

According to an aspect of an exemplary embodiment, there is provided a method for processing image data corresponding to temporally successive motions of an object, the method including adjusting a range of a first occlusion region which is estimated according to whether position changes occur in sub-blocks forming temporally successive first and second frames among image frames which display the motions of the object, by using Motion Vectors (MVs) mapped to the sub-blocks and detecting a second occlusion region of a third frame which displays the object that moves between the first frame and the second frame, by using the adjusted range of the first occlusion region.

According to another aspect of an exemplary embodiment, there is provided an apparatus for processing image data corresponding to temporally successive motions of an object, the apparatus including a controller configured to adjust a range of a first occlusion region which is estimated according to whether position changes occur in sub-blocks forming temporally successive first and second frames among image frames which display the motions of the object, by using Motion Vectors (MVs) mapped to the sub-blocks and detect a second occlusion region of a third frame which displays the object that moves between the first frame and the second frame, by using the adjusted range of the first occlusion region.

The adjusting of the range of the first occlusion region may comprise: mapping, to a first sub-block included in the range of the first occlusion region, a temporary MV which has a trajectory in a same direction as an MV of a sub-block which is closest to the first sub-block among sub-blocks located in a region outside the first occlusion region; comparing a difference between a random MV of the first sub-block with the temporary MV with a threshold; and excluding the first sub-block from the range of the first occlusion region if the difference exceeds the threshold. The threshold may be predetermined.

The region outside the first occlusion region may be a region other than an uncover region in the second frame, if the first occlusion region corresponds to the uncover region which newly appears in the second frame due to movement of the object.

The region outside the first occlusion region may be a region other than a cover region in the first frame, if the first occlusion region corresponds to the cover region which disappears from the first frame due to movement of the object.

The estimating according to whether position changes occur in the sub-blocks forming the first and second frames may comprise including MVs which are not one-to-one mapped to sub-blocks forming the second frame in the range of the first occlusion region, if the MVs which are not one-to-one mapped to the sub-blocks forming the second frame among MVs indicate moved positions of the object in the second frame for each of the sub-blocks of the first frame.

The estimating according to whether position changes occur in the sub-blocks forming the first and second frames may comprise including MVs which are not one-to-one mapped to sub-blocks forming the second frame in the range of the first occlusion region, if the MVs which are not one-to-one mapped to the sub-blocks forming the second frame among MVs indicate moved positions of the object in the first frame for each of the sub-blocks of the second frame.

The method may further comprise inserting the third frame between the first frame and the second frame and outputting the result.

The controller may map, to a first sub-block included in the range of the first occlusion region, a temporary MV which has a trajectory in a same direction as an MV of a sub-block which is closest to the first sub-block among sub-blocks located in a region outside the first occlusion region, compares a difference between a random MV of the first sub-block with the temporary MV with a threshold, and excludes the first sub-block from the range of the first occlusion region if the difference exceeds the threshold. The threshold may be predetermined.

The region outside the first occlusion region may be a region other than an uncover region in the second frame, if the first occlusion region corresponds to the uncover region which newly appears in the second frame due to movement of the object.

The region outside the first occlusion region may be a region other than a cover region in the first frame, if the first occlusion region corresponds to the cover region which disappears from the first frame due to movement of the object.

The apparatus may further comprise a position estimator configured to include MVs which are not one-to-one mapped to sub-blocks forming the second frame in the range of the first occlusion region, if the MVs which are not one-to-one mapped to the sub-blocks forming the second frame among MVs indicate moved positions of the object in the second frame for each of the sub-blocks of the first frame.

The apparatus may further comprise a position estimator configured to include MVs which are not one-to-one mapped to sub-blocks forming the second frame in the range of the first occlusion region, if the MVs which are not one-to-one mapped to the sub-blocks forming the second frame among MVs indicate moved positions of the object in the first frame for each of the sub-blocks of the second frame.

The apparatus may further comprise an output unit configured to insert the third frame between the first frame and the second frame and output the result.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF EXEMPLARY EMBODIMENTS

Hereinafter, operating principles for an exemplary embodiment will be described in detail with reference to the accompanying drawings. In the drawings, the same or similar elements are denoted by the same reference numerals and symbols even though they are depicted in different drawings. A detailed description of known functions and configurations will be omitted when it may unnecessarily obscure the subject matter of the present invention. Terminologies used below are defined considering functions in the exemplary embodiments, and the terminologies can be changed according to a user, an operator's intention, or custom. Therefore, the definition must be drawn on the basis of contents over this specification.

Figure 1:
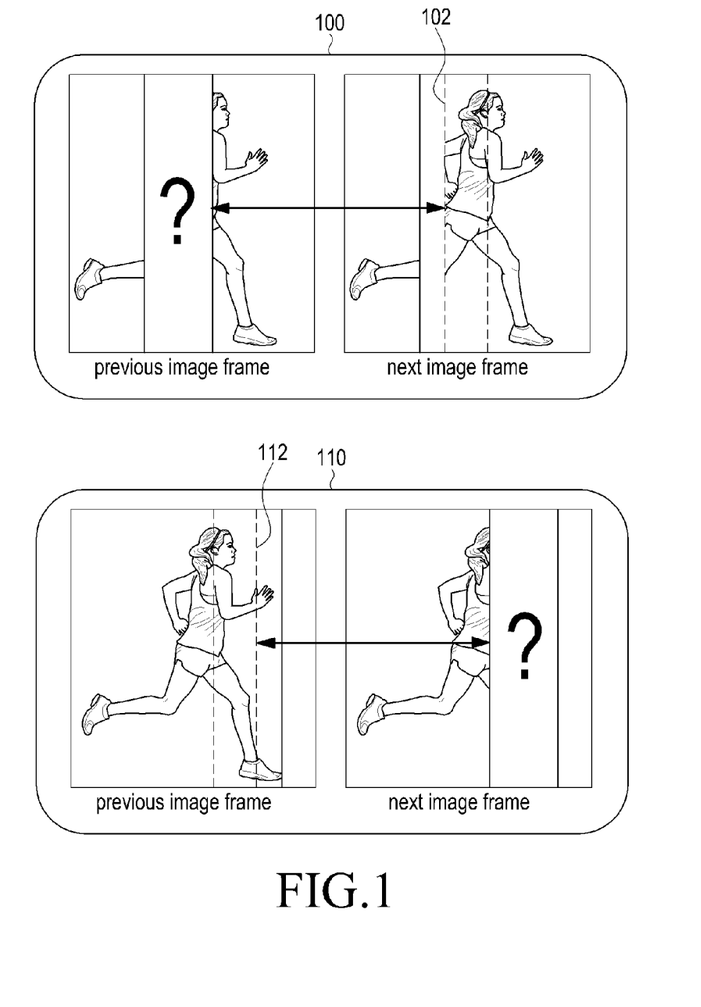
FIG. 1 is a diagram illustrating examples of occlusion types generated on two temporally successive image frames.

FIG. 1 is a diagram illustrating examples of occlusion types generated on two temporally successive image frames.

Referring to FIG. 1, two consecutive image frames in each of 100 and 110 display an uncovering type and a covering type of an image changed due to movement of a person on a background during a time difference between the image frames.

As to the uncovering type, out of the image frames in 100, an image frame temporally preceding the current time (hereinafter, 'a previous image frame') displays a person half hidden by a tree in the background and an image frame temporally following the current time (hereinafter, 'a next image frame') displays the person situated ahead of the tree through the movement. In the previous image frame, the person is partially hidden behind the tree of the background, such that a partial image region 102 corresponding to the partially hidden part of the person is not displayed. However, in the next image frame, the partial image region 102 is displayed. The partial image region 102 which is not displayed in the previous image frame is newly displayed in the next image frame due to movement of a corresponding object (ex, running man), which is defined as an uncovering phenomenon herein. The partial image region 102 is also defined as 'an uncover region' herein.

Next, in regard to the covering type, out of the image frames in 110, a previous image frame displays a partial region 112 which corresponds to a person's part located behind the tree of the background and a next image frame displays the background in which the partial region 112 is hidden behind the tree through movement of the person. The partial region 112 displayed in the previous image frame is not displayed in the next image frame due to movement of a corresponding object (ex, running man), which is defined as a covering phenomenon herein. The partial region 112 is defined as 'a cover region' herein. Hereinafter, throughout the specification, the cover/uncover regions will be assumed to have the same meaning as the occlusion regions.

As such, the uncover region and the cover region generated in two successive image frames respectively exist either in the previous image frame or the next image frame. For convenience, throughout the specification, the previous image frame and the next image frame are defined as original point-in-time frames. Thus, in an intermediate image frame situated temporally between the previous image frame and the next image frame (hereinafter, 'an interpolation point-in-time frame'), the uncover region and the cover region are interpolated referring to only image information displayed in one of the original point-in-time frames.

Therefore, when an interpolation point-in-time frame is detected using the original point-in-time frames as described above, the accuracy of detection of the uncover region in the interpolation point-in-time frame is degraded as the interpolation point-in-time approaches to the point-in-time of the original point-in-time previous image frame. Likewise, the accuracy of detection of the cover region in the interpolation point-in-time frame is degraded as the interpolation point-in-time approaches to the point-in-time of the original point-in-time next image frame.

Therefore, an exemplary embodiment will propose a method and apparatus for improving the accuracy of detection of an interpolation point-in-time occlusion region by detecting the interpolation point-in-time occlusion region which minimizes an influence of invalid Motion Vectors (MVs) based on occlusion region information acquired from the original point-in-time frames.

Figure 2:
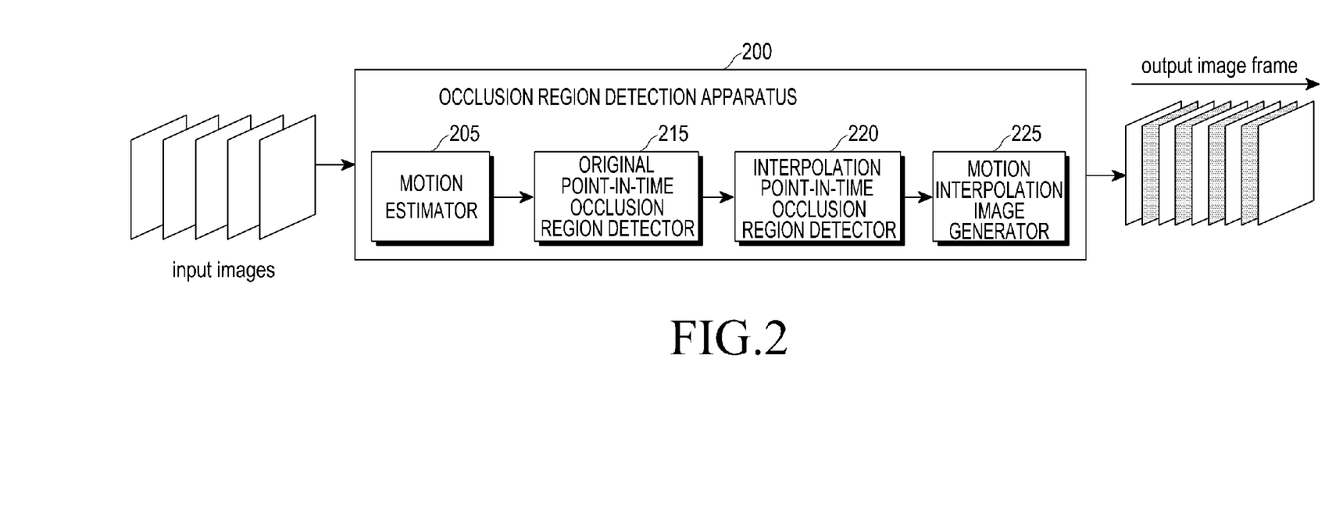
FIG. 2 is a schematic diagram illustrating an occlusion region detection apparatus according to an exemplary embodiment.

FIG. 2 is a schematic diagram illustrating an occlusion region detection apparatus according to an exemplary embodiment. The occlusion region detection apparatus according to the exemplary embodiment may be implemented by adding a function to one of the image processors of a device capable of displaying an image or may be implemented by adding a new unit. Examples which may be implemented are not directly related to the exemplary embodiments, and thus will not be described in detail.

Referring to FIG. 2, an occlusion region detection apparatus 200 includes a motion estimator 205, an occlusion region detector 215, an interpolation point-in-time occlusion region detector 220, and a motion interpolation image generator 225. Herein, separate components corresponding to respective operations according to an exemplary embodiment are provided, but in real implementation, the components may be configured with one unit or different units. The occlusion region detection apparatus 200 may also include a memory and processor configured to execute the operations of the apparatus 200 as described herein.

Figure 3A:
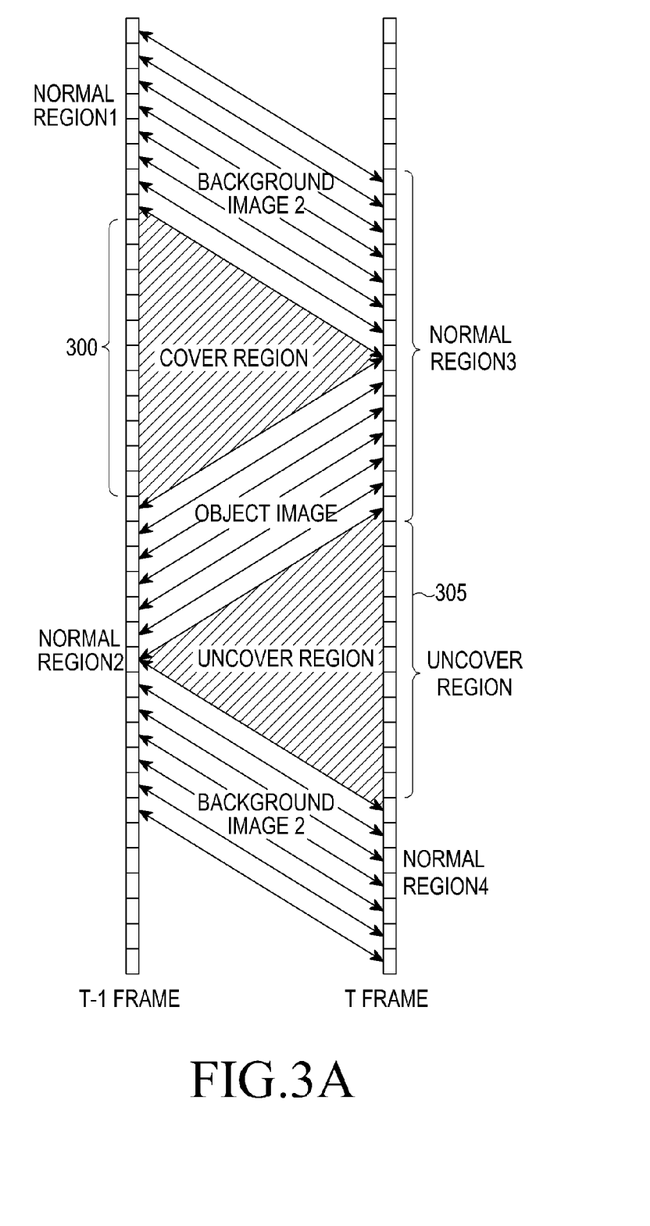
FIG. 3A is a diagram illustrating an example in which a position change estimation result in original point-in-time frames acquired by a motion estimator according to an exemplary embodiment is expressed using Motion Vectors (MVs)

Referring to FIG. 2, the motion estimator 205 receives input of image data forming a moving image or video. Each image data is composed of temporally successive image frames, each of which is divided into sub-blocks corresponding to pixels of the frame. Each sub-block is composed of one or more pixels and may have a rectangular or geometrical shape. The motion estimator 205 estimates a position change of a sub-block by using MVs of sub-blocks forming two successive image frames among the temporally successive image frames of each image data. More specifically, FIG. 3A is a diagram illustrating an example in which a position change estimation result in original point-in-time frames acquired by the motion estimator 205 is expressed using MVs. In FIG. 3A, among image frames input to the motion estimator 205, two successive image frames, that is, a ((T−1)) frame corresponding to a previous image frame and a T frame corresponding to a next image frame are shown for example. The motion estimator 205 generates an MV having a trajectory in a direction connecting one sub-block of the (T−1) frame with corresponding one sub-block of the T frame, thereby determining a position change of a pixel. For example, the motion estimator 205 acquires MVs which connect respective sub-blocks of Normal Region 2 of the T frame to corresponding sub-blocks of the (T−1) frame. In this case, the motion estimator 205 checks trajectories along which MVs corresponding to Object Image among the MVs in Normal Region 2 are connected with sub-blocks of a lower portion of Normal Region 3 of the T frame, thereby identifying a motion of the object. Likewise, the motion estimator 205 checks trajectories along which MVs in Normal Region 1 corresponding to Background Image 1 in the (T−1) frame are connected with sub-blocks of an upper portion of Normal Region 3 of the T frame, thereby identifying a motion of the background. The motion estimator 205 forwards the position change estimation result in the original point-in-time frames acquired using MVs having trajectories connecting corresponding sub-blocks to the original point-in-time occlusion region detector 215.

Then, the original point-in-time occlusion region detector 215 recognizes that there is no sub-block of the T frame mapped to sub-blocks 300 except for the sub-blocks of Normal Region 1 and Normal Region 2 among the sub-blocks of the (T−1) frame. The original point-in-time occlusion region detector 215 recognizes that the covering phenomenon occurs in the sub-blocks 300 of the (T−1) frame due to position changes of Normal Region 1 and Normal Region 2 corresponding to Object Image in the T frame. Thus, the original point-in-time occlusion region detector 215 identifies a position of the cover region 300 and forwards information about the identified position of the original point-in-time cover region 300 to the interpolation point-in-time occlusion region detector 220. The information about the identified position of the original point-in-time cover region 300 includes the number and positions of sub-blocks of the cover region 300 in the (T−1) frame.

Similarly, the original point-in-time occlusion region detector 215 recognizes that MVs of Normal Region 3 corresponding to Object Image are connected with sub-blocks of an upper portion of Normal Region 2 in the (T−1) frame and MVs of sub-blocks of Normal Region 4 corresponding to Background Image 2 in the T frame are connected with sub-blocks of a lower portion of Normal Region 2 in the (T−1) frame. Then, the original point-in-time occlusion region detector 215 recognizes that sub-blocks between Normal Region 3 and Normal Region 4 are not connected with any sub-block of the (T−1) frame, thus determining that the uncovering phenomenon occurs in the T frame. The original point-in-time occlusion region detector 215 identifies a position of an original point-in-time uncover region 305 and forwards information about the identified position of the original point-in-time uncover region 305 to the interpolation point-in-time occlusion region detector 220. The information about the identified position of the original point-in-time uncover region 305 includes the number (hereinafter, also referred to as 'a position range') and positions of sub-blocks of the uncover region 305 in the T frame.

Figure 3B:
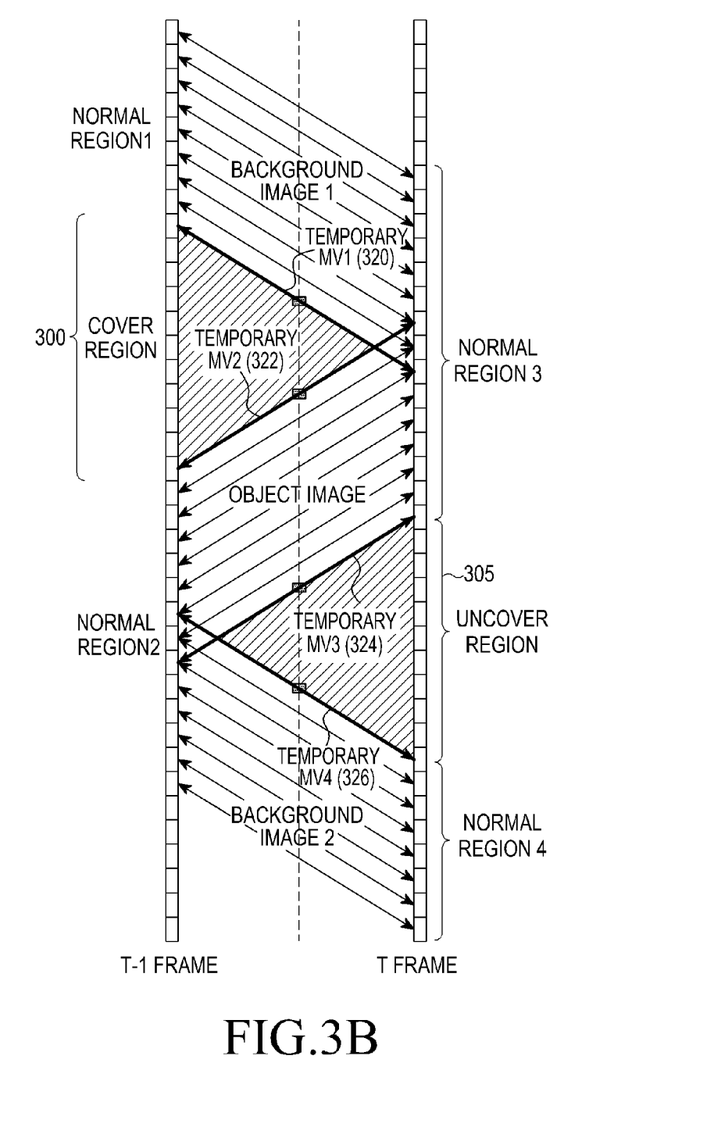
FIG. 3B is a diagram illustrating an example of a scheme in which an occlusion region detector detects an interpolation point-in-time occlusion region according to an exemplary embodiment.

Thereafter, the interpolation point-in-time occlusion region detector 220, upon acquiring the information about the position of the original point-in-time uncover region and the information about the position of the original point-in-time cover region, detects the interpolation point-in-time uncover region and the interpolation point-in-time cover region within the position ranges of the original point-in-time uncover region and cover region. More specifically, FIG. 3B is a diagram illustrating an example of a scheme in which the occlusion region detector 220 detects an interpolation point-in-time occlusion region according to an exemplary embodiment of the present invention. For convenience, it is assumed that the original point-in-time occlusion region is the same as the original point-in-time occlusion region illustrated in FIG. 3A. Referring to FIG. 3B, the interpolation point-in-time occlusion region detector 220 maps temporally MV1 320 and MV2 322 to two edge sub-blocks of the original point-in-time cover region 300 in the (T−1) frame such that the two edge sub-blocks have trajectories in the same direction as MVs of sub-blocks, which are closest to the two edge sub-blocks, among sub-blocks located outside the cover region 300. Likewise, the interpolation point-in-time occlusion region detector 220 maps temporally MV3 324 and MV4 326 to two edge sub-blocks of the original point-in-time uncover region 305 in the T frame such that the two edge sub-blocks have trajectories in the same direction as MVs of sub-blocks, which are closest to the two edge sub-blocks, among sub-blocks located outside the uncover region 305.

Substantially, in the (T−1) frame, the MVs of the sub-blocks of the cover region 300 have no actual mapping relationship with sub-blocks of the T frame, such that those MVs are generated as random MVs whose actual trajectory directions are not predictable. Therefore, the interpolation point-in-time occlusion region detector 220 compares each of the temporary MV1, MV2, MV3, and MV4 320 through 326 of the sub-blocks of the cover region 300 and the uncover region 305 with a random MV of the corresponding sub-block. According to whether a difference between the temporary MV and the random MV is less than a predefined MV difference threshold, the interpolation point-in-time occlusion region detector 220 includes or excludes the sub-blocks corresponding to the temporary MVs in or from the range of the cover region 300 or the uncover region 305, thereby re-adjusting the range of the original point-in-time occlusion region. That is, if the MV difference between the edge sub-blocks of the cover region 300 or the uncover region 305 is less than the predefined MV difference threshold, the interpolation point-in-time occlusion region detector 220 maintains the range of the cover region 300 or the uncover region 305. On the other hand, if a difference exists which is not less than the MV difference threshold, a sub-block corresponding to the difference is excluded from the corresponding region range. In this case, the interpolation point-in-time occlusion region detector 220 acquires a difference between the temporary MV with the random MV for each of the other sub-blocks in the same manner as the edge sub-blocks and re-adjusts the range of the original point-in-time occlusion region according to the result of comparison of the difference with the MV difference threshold.

Figure 3C:
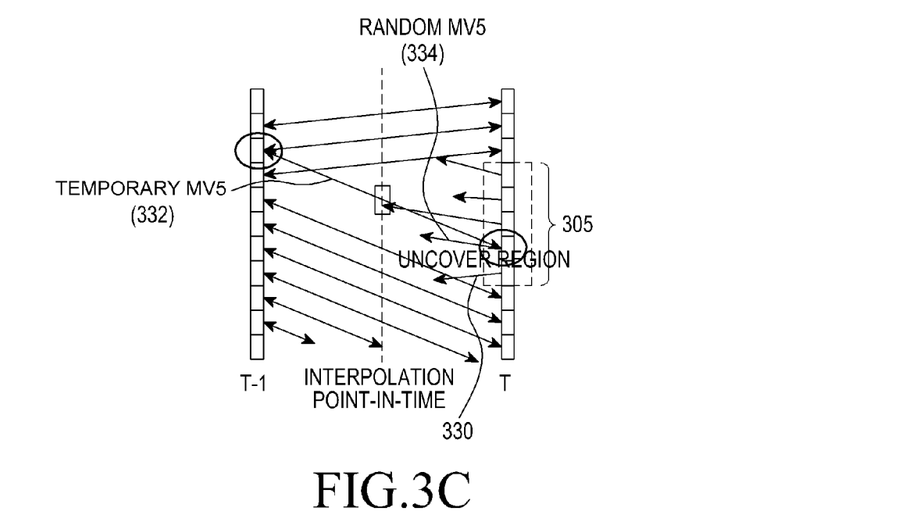
FIGS. 3C through 3E are diagrams for describing an operation of comparing temporary MVs with real MVs in an uncover region according to an exemplary embodiment.
Figure 3D:
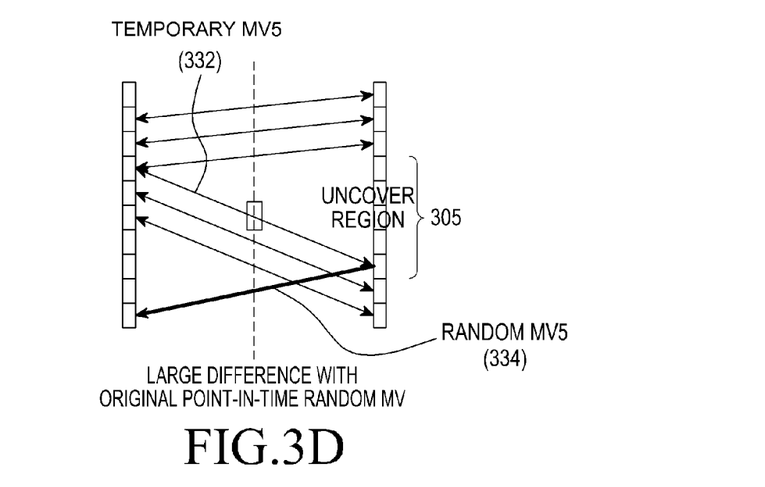
Figure 3E:
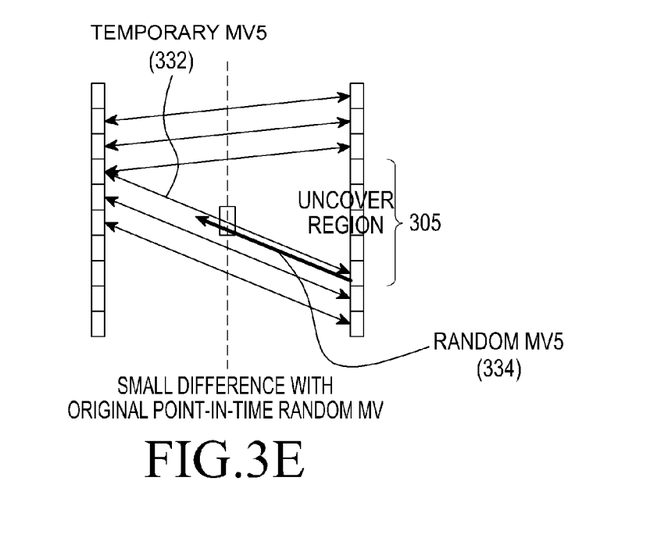

To be more specific, FIGS. 3C through 3E are diagrams for describing an operation of comparing temporary MVs with random MVs in the uncover region 305 according to an exemplary embodiment. Referring to FIG. 3C, it is assumed that a difference between the temporary MV4 326 of FIG. 3B and a random MV 330 of an edge sub-block of the uncover region 305 corresponding to the random MV4 326 is not less than the MV difference threshold. In this case, the interpolation point-in-time occlusion region detector 220 maps a temporary MV5 332 of a sub-block, which is located at the edge prior to the edge sub-block, among the sub-blocks of the uncover region 305 to the edge sub-block such that the edge sub-block has a trajectory in the same direction as an MV of a sub-block closest to the edge sub-block. The interpolation point-in-time occlusion region detector 220 calculates a difference between the temporary MV5 332 and a random MV4 334 and determines if the calculated difference is less than the MV difference threshold. If the difference between the temporary MV5 332 and the random MV4 334 is much larger than the MV difference threshold as illustrated in FIG. 3D, the interpolation point-in-time occlusion region detector 220 excludes the sub-block from uncover region 305 and performs comparison for the next sub-block among the sub-blocks of the uncover region 305, thereby re-adjusting the scope of the uncover region 305. If the difference between the temporary MV5 332 and the random MV4 334 of the sub-block is very small and is thus less than the MV difference threshold as illustrated in FIG. 3E, the interpolation point-in-time occlusion region detector 220 re-adjusts the range of the uncover region 305 to extend to the sub-block corresponding to the random MV5 334. FIGS. 3C through 3E illustrate a process in which the interpolation point-in-time occlusion region detector 220 adjusts the range of the original point-in-time uncover region as an example. However, a process in which the interpolation point-in-time occlusion region detector 220 re-adjusts the range of the original point-in-time cover region is almost similar to re-adjustment of the range of the (original point-in-time) uncover region, and thus that process will not be described in detail.

As such, upon completion of re-adjustment of the ranges of the original point-in-time cover region and uncover region acquired by the original point-in-time occlusion region detector 215, the interpolation point-in-time occlusion region detector 220 detects the respective re-adjusted ranges of the original point-in-time cover region and uncover region as the range of the interpolation point-in-time occlusion region. The interpolation point-in-time occlusion region detector 220 forwards information about the detected range of the interpolation point-in-time occlusion region to the motion interpolation image generator 225. The motion interpolation image generator 225 generates an interpolation point-in-time frame to be inserted into an intermediate point in time between the (T−1) frame and the T frame from the original point-in-time position change estimation result acquired by the motion estimator 205 as illustrated in FIG. 3A, and generates an interpolation point-in-time frame by applying the information about the range of the interpolation point-in-time occlusion region acquired from the interpolation point-in-time occlusion region detector 220 to the interpolation point-in-time frame. The interpolation point-in-time frame is then inserted at the intermediate point in time between the (T−1) frame and the T frame and the result is output.

In this way, the occlusion region detection apparatus 200 according to an exemplary embodiment generates interpolation point-in-time frames for image frames corresponding to input image data, inserts the interpolation point-in-time frames between original point-in-time image frames, and outputs the result.

Figure 4A:
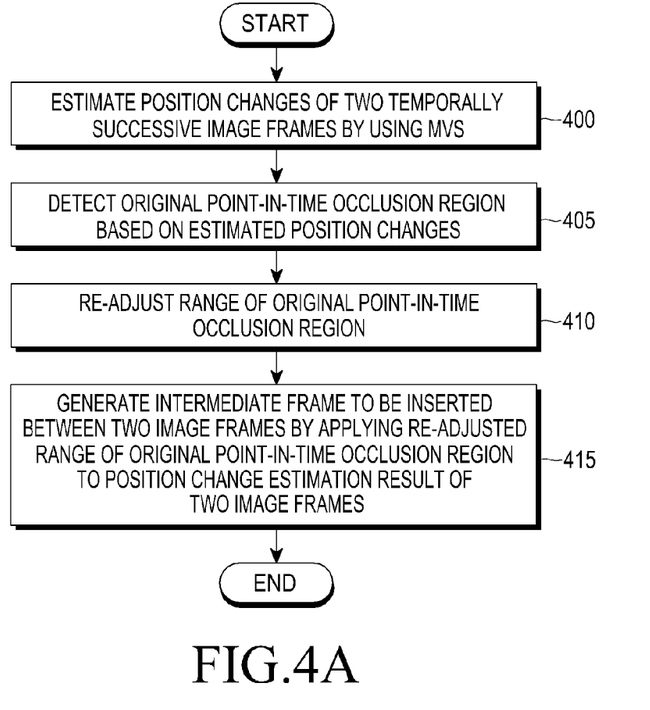
FIG. 4A is a flowchart illustrating an operation of an occlusion region detection apparatus according to an exemplary embodiment.

FIG. 4A is a flowchart illustrating an operation of the occlusion region detection apparatus 200 according to an exemplary embodiment.

Referring to FIG. 4A, in step 400, the occlusion region detection apparatus 200 estimates position changes of two input temporally successive image frames by using MVs.

In step 405, the occlusion region detection apparatus 200 detects an original point-in-time occlusion region based on the estimated position change.

In step 410, the occlusion region detection apparatus 200 re-adjusts a range of the original point-in-time occlusion region.

In step 415, the occlusion region detection apparatus 200 generates an intermediate frame to be inserted between the two image frames by applying the re-adjusted range of the original point-in-time occlusion region to the result of estimation of the position changes of the two image frames. The occlusion region detection apparatus 200 then inserts intermediate frames generated by repeating steps 400 through 415 for other input image frames and outputs the result.

Figure 4B:
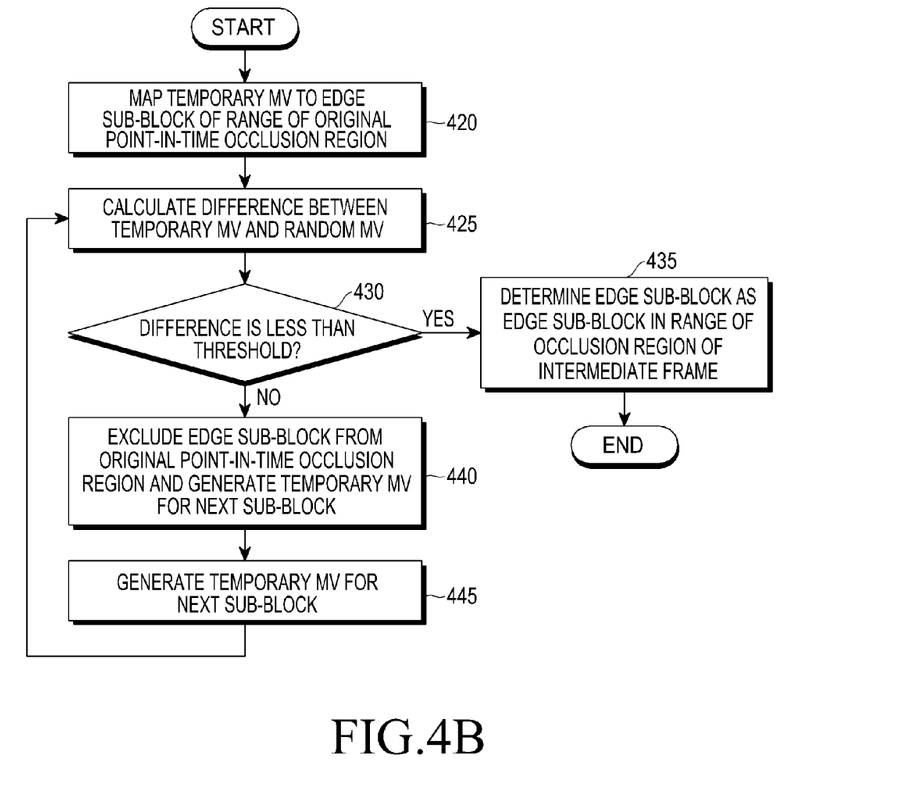
FIG. 4B is a flowchart illustrating in detail an operation of re-adjusting a range of an original point-in-time occlusion region by an occlusion region detection apparatus according to an exemplary embodiment.

FIG. 4B is a flowchart illustrating in detail an operation of re-adjusting a range of an original point-in-time occlusion region by the occlusion region detection apparatus 200 according to an exemplary embodiment.

Referring to FIG. 4B, in step 420, the occlusion region detection apparatus 200 maps, to an edge sub-block among sub-blocks corresponding to the range of the original point-in-time occlusion region, a temporary MV having a trajectory in the same direction as a sub-block, which is closest to the edge sub-block, among sub-blocks located outside the original point-in-time occlusion region.

In step 425, the occlusion region detection apparatus 200 calculates a difference between the temporary MV and a random MV of the edge sub-block.

In step 430, the occlusion region detection apparatus 200 compares the calculated difference with a predefined MV difference threshold. If the difference is less than the MV difference threshold, the occlusion region detection apparatus 200 determines the edge sub-block as an edge sub-block forming an occlusion region of an intermediate frame in step 435.

If the difference is not less than the MV difference threshold, the occlusion region detection apparatus 200 excludes the edge sub-block from the sub-blocks forming the occlusion region in v 440. In step 445, the occlusion region detection apparatus 200 generates a temporary MV for a next sub-block located previous to the edge sub-block among the sub-blocks corresponding to the range of the original point-in-time occlusion region in the same manner as with the edge sub-block and goes back to step 425. The occlusion region detection apparatus 200 repeats step 425 through 440 for the other sub-blocks except for the excluded sub-block among the sub-blocks corresponding to the range of the original point-in-time occlusion region, to determine the range of the occlusion region of the intermediate frame.

As is apparent from the foregoing description, by detecting an original point-in-time occlusion (cover/uncover) region corresponding to a previous image frame preceding generation of a motion of an object, detecting a range of the detected original point-in-time occlusion region in reconstruction of an intermediate frame between the previous image frame and a next image frame following generation of the motion of the object, and re-adjusting the detected range of the original point-in-time occlusion region to detect an occlusion region of the intermediate frame, the accuracy of detection of the occlusion region may be improved regardless of a point in time at which the intermediate frame is generated and an MV region of an invalid occlusion region may be minimized.

While a detailed exemplary embodiment has been described in the foregoing description, various modifications can be carried out without departing from the scope of the present invention. Therefore, it is obvious that the scope of the invention is not defined by the foregoing exemplary embodiment, but by the appended claims and equivalents thereof.

What is claimed is:

1. A method for processing image data corresponding to temporally successive motions of an object, the method comprising:
   adjusting a range of a first occlusion region which is estimated according to whether position changes occur in sub-blocks forming temporally successive first and second frames among image frames which display the motions of the object, by using Motion Vectors (MVs) mapped to the sub-blocks; and detecting a second occlusion region of a third frame which displays the object that moves between the first frame and the second frame, by using the adjusted range of the first occlusion region,
   wherein the adjusting of the range of the first occlusion region comprises:
   mapping, to a first sub-block included in the range of the first occlusion region, a temporary MV which has a trajectory in a same direction as an MV of a sub-block which is closest to the first sub-block among sub-blocks located in a region outside the first occlusion region; and
   if a difference between a random MV of the first sub-block with the temporary MV exceeds a predetermined threshold, excluding the first sub-block from the range of the first occlusion region.

2. The method of claim 1, wherein the region outside the first occlusion region is a region other than an uncover region in the second frame, if the first occlusion region corresponds to the uncover region which newly appears in the second frame due to movement of the object.

3. The method of claim 1, wherein the region outside the first occlusion region is a region other than a cover region in the first frame, if the first occlusion region corresponds to the cover region which disappears from the first frame due to movement of the object.

4. The method of claim 1, wherein the estimating according to whether position changes occur in the sub-blocks forming the first and second frames comprises including MVs which are not one-to-one mapped to sub-blocks forming the second frame in the range of the first occlusion region, if the MVs which are not one-to-one mapped to the sub-blocks forming the second frame among MVs indicate moved positions of the object in the second frame for each of the sub-blocks of the first frame.

5. The method of claim 1, wherein the estimating according to whether position changes occur in the sub-blocks forming the first and second frames comprises including MVs which are not one-to-one mapped to sub-blocks forming the second frame in the range of the first occlusion region, if the MVs which are not one-to-one mapped to the sub-blocks forming the second frame among MVs indicate moved positions of the object in the first frame for each of the sub-blocks of the second frame.

6. An apparatus for processing image data corresponding to temporally successive motions of an object, the apparatus comprising a controller configured to:
   adjust a range of a first occlusion region which is estimated according to whether position changes occur in sub-blocks forming temporally successive first and second frames among image frames which display the motions of the object, by using Motion Vectors (MVs) mapped to the sub-blocks; and
   detect a second occlusion region of a third frame which displays the object that moves between the first frame and the second frame, by using the adjusted range of the first occlusion region,
   wherein the controller maps, to a first sub-block included in the range of the first occlusion region, a temporary MV which has a trajectory in a same direction as an MV of a sub-block which is closest to the first sub-block among sub-blocks located in a region outside the first occlusion region; and if a difference between a random MV of the first sub-block with the temporary MV exceeds a predetermined threshold, the controller excludes the first sub-block from the range of the first occlusion region.

7. The apparatus of claim 6, wherein the region outside the first occlusion region is a region other than an uncover region in the second frame, if the first occlusion region corresponds to the uncover region which newly appears in the second frame due to movement of the object.

8. The apparatus of claim 6, wherein the region outside the first occlusion region is a region other than a cover region in the first frame, if the first occlusion region corresponds to the cover region which disappears from the first frame due to movement of the object.

9. The apparatus of claim 6, further comprising a position estimator configured to include MVs which are not one-to-one mapped to sub-blocks forming the second frame in the range of the first occlusion region, if the MVs which are not one-to-one mapped to the sub-blocks forming the second frame among MVs indicate moved positions of the object in the second frame for each of the sub-blocks of the first frame.

10. The apparatus of claim 6, further comprising a position estimator configured to include MVs which are not one-to-one mapped to sub-blocks forming the second frame in the range of the first occlusion region, if the MVs which are not one-to-one mapped to the sub-blocks forming the second frame among MVs indicate moved positions of the object in the first frame for each of the sub-blocks of the second frame.

11. The apparatus of claim 6, further comprising an output unit configured to insert the third frame between the first frame and the second frame and output the result.

* * * * *